July 29, 1958 V. A. PECKHAM, JR 2,845,293
CONSUMABLE ELECTRODE
Filed April 1, 1957

INVENTOR.
VICTOR A. PECKHAM JR.
BY
Brown, Critchlow, Flick & Peckham
HIS ATTORNEYS United States Patent Office 2,845,293
Patented July 29, 1958

2,845,293

CONSUMABLE ELECTRODE

Victor A. Peckham, Jr., Pittsburgh, Pa., assignor to Universal-Cyclops Steel Corporation, Bridgeville, Pa., a corporation of Pennsylvania Application April 1, 1957, Serial No. 649,875

6 Claims. (Cl. 287—104)

This invention relates to consumable electrodes that are melted down to form metal ingots.

The use of consumable electrodes for making ingots, particularly of such metals as molybdenum, titanium and zirconium, is well known. Such an electrode is illustrated in Herres Patent 2,697,126. That electrode is formed from sticks or bars of compressed metal particles, two vertical rows of the bars being welded together for the full length of their meeting edges. As the lower end of the electrode is melted, an ingot is formed in the surrounding mold.

It has been found that the welds which join such bars together to form an electrode are not dependable and that the electrode may break apart in use, especially when it is long and heavy. This is because welding of the vertical edges of the bars melts the metal particles in those areas and therefore changes the density and character of the portions of the bars immediately adjoining the welds, for the main body of each bar is composed of particles that are only sintered together. The welded areas will shrink more than the rest of the electrode and are likely to break away. Furthermore, to be successful at all with the welds, the bars must be sintered first.

It is among the objects of this invention to provide a consumable electrode formed from short bars composed of metal particles compressed together, in which the bars are interlocked together, in which unsintered bars can be connected together without welding, and in which the bars will not break as the electrode is being consumed.

In accordance with this invention the compressed bars are arranged in two vertically extending rows disposed face to face, with the bars in each row staggered relative to those in the other row. The adjoining faces of the two rows of bars are provided with interengaging teeth extending across them to prevent the bars from moving vertically relative to one another. In order to hold the teeth in interengaging relation, means are provided at spaced intervals along the electrode to join the two rows. Such means may consist merely of wires wrapped around the electrode, or, where the bars have been sintered, they may be spot welded together at spaced points. To facilitate release of the bars from the pressing dies and yet to cause their teeth to exert as much friction against each other as possible, the faces of the teeth should preferably be disposed at an angle between about 19° and 22° to the horizontal. Also, to avoid too much variation in density of the bars, which tends to weaken them, the depth of the teeth should be substantially no greater than about 20% of the thickness of a bar.

The invention is illustrated in the accompanying drawings, in which

Figure 1:
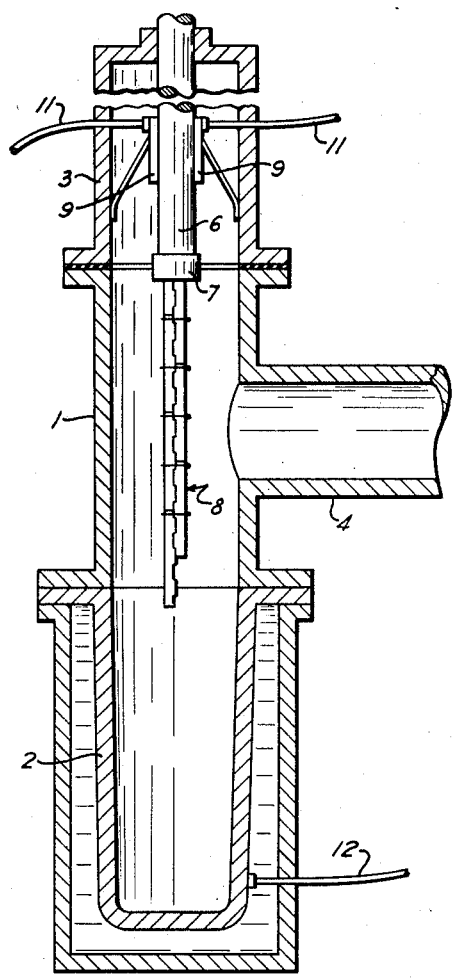
Fig. 1 represents a vertical section through apparatus for melting down a consumable electrode.
Figure 3:
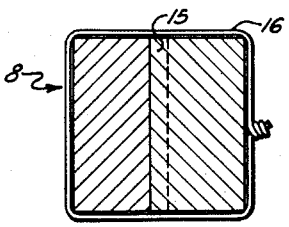
Fig. 3 is a cross section thereof, as taken on the line 3—3 of Fig. 2.

Referring to Fig. 1 of the drawings, a vertical tubular furnace 1 is shown removably mounted on top of a water-cooled ingot mold 2. Mounted on top of the furnace is a vertical tube 3 that has a closed upper end. The tube and furnace and mold are all air tight so that air can be exhausted from within them through a pipe 4 attached to one side of the furnace. Slidable vertically through a suitable seal in the upper end of the tube is a rod 6 that is provided at its lower end with a clamp 7 for supporting the upper end of a consumable electrode 8. The side of the rod is engaged by electric brushes 9 that are electrically connected through a cable 11 with a source of electric current (not shown). The mold is also connected with the current source by a cable 12, so that an arc can be struck between the lower end of the electrode and the bottom of the mold or the molten metal in it. The rod 6 can be moved vertically in the tube and furnace in any well-known manner to lower the electrode as it is melted in the mold.

The electrode is formed from two rows of short metal bars 14 disposed face to face, with the bars in one row staggered relative to those in the other row, whereby each bar extends across the joint between the ends of a pair of bars. Each bar is composed essentially of metal particles, such as powdered metal, which have been compressed together under great pressure. For example, when the bars are made of molybdenum powder, they may be compressed under twenty tons per square inch. Such bars will have considerable tensile strength without being sintered. One of the pressing dies is shaped to form transverse teeth 15 on one side of each bar. If the teeth are wide and have flat outer ends, they are easier to form and it is not necessary to have as many as if they were in the form of saw teeth. Since the volume of a bar where there is a tooth will not be compressed so much as the volume between teeth, the depth of the teeth should be no greater than about 20% of the thickness of the bar. Otherwise, the difference in density between the different zones just mentioned may be great enough to weaken the bar and teeth. Another reason for molding only shallow teeth is that it will help avoid sticking of the bar in the die that forms the teeth. Teeth that are only about one fourth of an inch in depth have been found to be satisfactory.

Figures 2, 4:
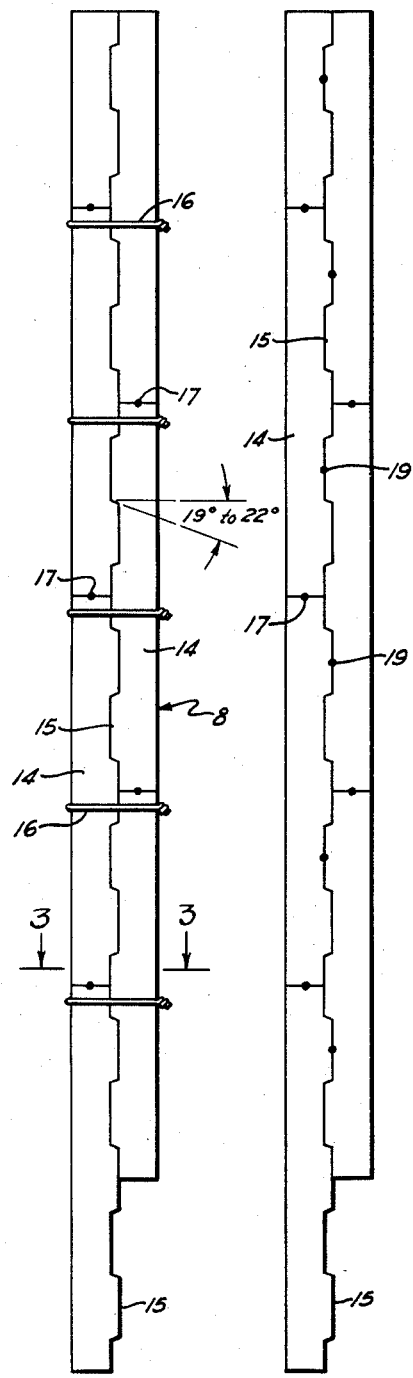
Fig. 2 is a fragmentary enlarged side view of the electrode.
Fig. 4 is a fragmentary side view of a modification.

The angle of the teeth faces is important, because it is highly desirable to have them as nearly horizontal as possible in order that the friction between engaging teeth will overcome practically all of the tendency of facing bars to slide laterally away from each other. However, the faces of the teeth cannot be made perpendicular to the longitudinal axis of the electrode, because the bars then would not separate from the dies. I have discovered that the best angle for accomplishing both desired results is between 19° and 22° to the horizontal, as shown in Fig. 2. The deeper the tooth, the greater this angle should be in the range just given.

When the bars are assembled in staggered relation as shown, it will be seen that they are prevented from falling away from one another by the interlocking of their teeth, provided the two rows of bars cannot move laterally away from each other. To prevent such lateral movement when the bars have not been sintered, short lengths of wire 16 of the same metal as the bars are wrapped snugly around the electrode at vertically spaced intervals. There should be a wire as close to the upper end of each bar as possible so that there will be only a small fragment of the bar above the wire that can fall away after the wire has melted. A small fragment should melt readily in the molten metal in the mold. It will be seen that if the wires are disposed only at the upper ends of the bars, there will need to be only two wires wrapped around each bar. Thus, a much quicker and less expensive way of connecting the two rows of bars together is provided than if they had to be welded along their vertical edges from top to bottom. Of course, with unsintered bars, such welding could not be accomplished satisfactorily anyway.

In case the bars have been sintered, such as at 3000° F. for molybdenum, the upper end of each bar can be tack welded to the bar above it by a spot weld 17, if desired, to prevent even the uppermost end of the bar from falling into the mold. Such welds do not stress the material like the seam welds extending from top to bottom in the prior art. Moreover, due to the fact that the teeth take all of the weight of the electrode, the spot welds do not have to support anything more than the small pieces of bars that are left after the wires around their upper ends have melted away. Tack welds are adequate for that purpose.

It also is possible, where the bars have been sintered, to omit the wires 16 if desired and to connect the two rows of bars together by occasional spot welds 19 at their meeting edges as shown in Fig. 4. As explained in the preceding paragraph, such tack welds will not break the material away, and they do not have to be strong because they do not support the bars. All they do is prevent the two rows of bars from moving laterally away from each other, and since the inclined faces of the teeth are so nearly horizontal, there is little tendency for such separation anyway.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A consumable electrode comprising a plurality of short bars composed essentially of metal particles compressed together, the bars being arranged in two vertically extending rows disposed face to face and the bars in each row being staggered relative to those in the other row, the adjoining faces of the two rows of bars being provided with interengaging teeth extending transversely thereof to hold the bars against vertical movement relative to one another, and means spaced vertically along the electrode holding the two rows of bars face to face with their teeth engaging.

2. A consumable electrode comprising a plurality of short bars composed essentially of metal particles compressed together, the bars being arranged in two vertically extending rows disposed face to face and the bars in each row being staggered relative to those in the other row, the adjoining faces of the two rows of bars being provided with interengaging teeth extending transversely thereof to hold the bars against vertical movement relative to one another, the faces of said teeth being inclined at an angle between about 19° and 22° to the horizontal, and means spaced vertically along the electrode holding the two rows of bars face to face with their teeth engaging.

3. A consumable electrode comprising a plurality of short bars composed essentially of metal particles compressed together, the bars being arranged in two vertically extending rows disposed face to face and the bars in each row being staggered relative to those in the other row, the adjoining faces of the two rows of bars being provided with interengaging teeth extending transversely thereof to hold the bars against vertical movement relative to one another, the depth of said teeth being substantially no greater than about 20% of the thickness of a bar, and means spaced vertically along the electrode holding the two rows of bars face to face with their teeth engaging.

4. A consumable electrode comprising a plurality of short bars composed essentially of metal particles compressed together, the bars being arranged in two vertically extending rows disposed face to face and the bars in each row being staggered relative to those in the other row, the adjoining faces of the two rows of bars being provided with interengaging teeth extending transversely thereof to hold the bars against vertical movement relative to one another, and wires wrapped around the electrode close to the top of each bar to hold the two rows of bars face to face with their teeth engaging.

5. A consumable electrode comprising a plurality of short sintered bars composed essentially of metal particles compressed together, the bars being arranged in two vertically extending rows disposed face to face and the bars in each row being staggered relative to those in the other row, the adjoining faces of the two rows of bars being provided with interengaging teeth extending transversely thereof to hold the bars against vertical movement relative to one another, and spot welds connecting the bars in each row to the bars in the other row to hold them face to face with their teeth engaging.

6. A consumable electrode comprising a plurality of short sintered bars composed essentially of metal particles compressed together, the bars being arranged in two vertically extending rows disposed face to face and the bars in each row being staggered relative to those in the other row, the adjoining faces of the two rows of bars being provided with interengaging teeth extending transversely thereof to hold the bars against vertical movement relative to one another, the faces of said teeth being inclined at an angle between about 19° and 22° to the horizontal, wires wrapped around the electrode to hold the two rows of bars face to face with their teeth engaging, and spot welds connecting the upper ends of the bars to the lower ends of the bars above them.

No references cited.